(12) United States Patent
Miyanaga et al.

(10) Patent No.: US 12,556,091 B2
(45) Date of Patent: Feb. 17, 2026

(54) BUCK DC/DC CONVERTER AND CONTROLLER CIRCUIT OF BUCK DC/DC CONVERTER

(71) Applicant: ROHM Co., LTD., Kyoto (JP)

(72) Inventors: Koichi Miyanaga, Kyoto (JP); Hayato Asano, Kyoto (JP); Nobuyuki Yokoyama, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 198 days.

(21) Appl. No.: 18/468,845

(22) Filed: Sep. 18, 2023

(65) Prior Publication Data

US 2024/0106331 A1     Mar. 28, 2024

(30) Foreign Application Priority Data

Sep. 22, 2022 (JP) ................. 2022-151832

(51) Int. Cl.
*H02M 3/158* (2006.01)
*H02M 1/00* (2006.01)

(52) U.S. Cl.
CPC ......... *H02M 3/158* (2013.01); *H02M 1/0025* (2021.05)

(58) Field of Classification Search
CPC .... H02M 3/158; H02M 3/155; H02M 3/1552; H02M 3/156; H02M 3/1566; H02M 3/157; H02M 1/0025; H02M 1/0016; H02M 1/0003
See application file for complete search history.

(56) References Cited

U.S. PATENT DOCUMENTS

2006/0006850 A1*  1/2006  Inoue ............... H02J 7/007182
                                                              323/265

FOREIGN PATENT DOCUMENTS

JP        7102307        7/2022

* cited by examiner

*Primary Examiner* — Nguyen Tran
(74) *Attorney, Agent, or Firm* — CHIP Law Group LLP

(57) ABSTRACT

Provided is a controller circuit of a buck DC/DC converter. The controller circuit includes a feedback pin to be connected to an output line of the buck DC/DC converter, a voltage divider circuit including a first resistor and a second resistor connected in series between the feedback pin and a ground, a feedback circuit that generates a pulse modulation signal to bring a feedback voltage as an output of the voltage divider circuit close to a reference voltage, and a current source that is connected to the feedback pin and supplies a constant current.

5 Claims, 5 Drawing Sheets

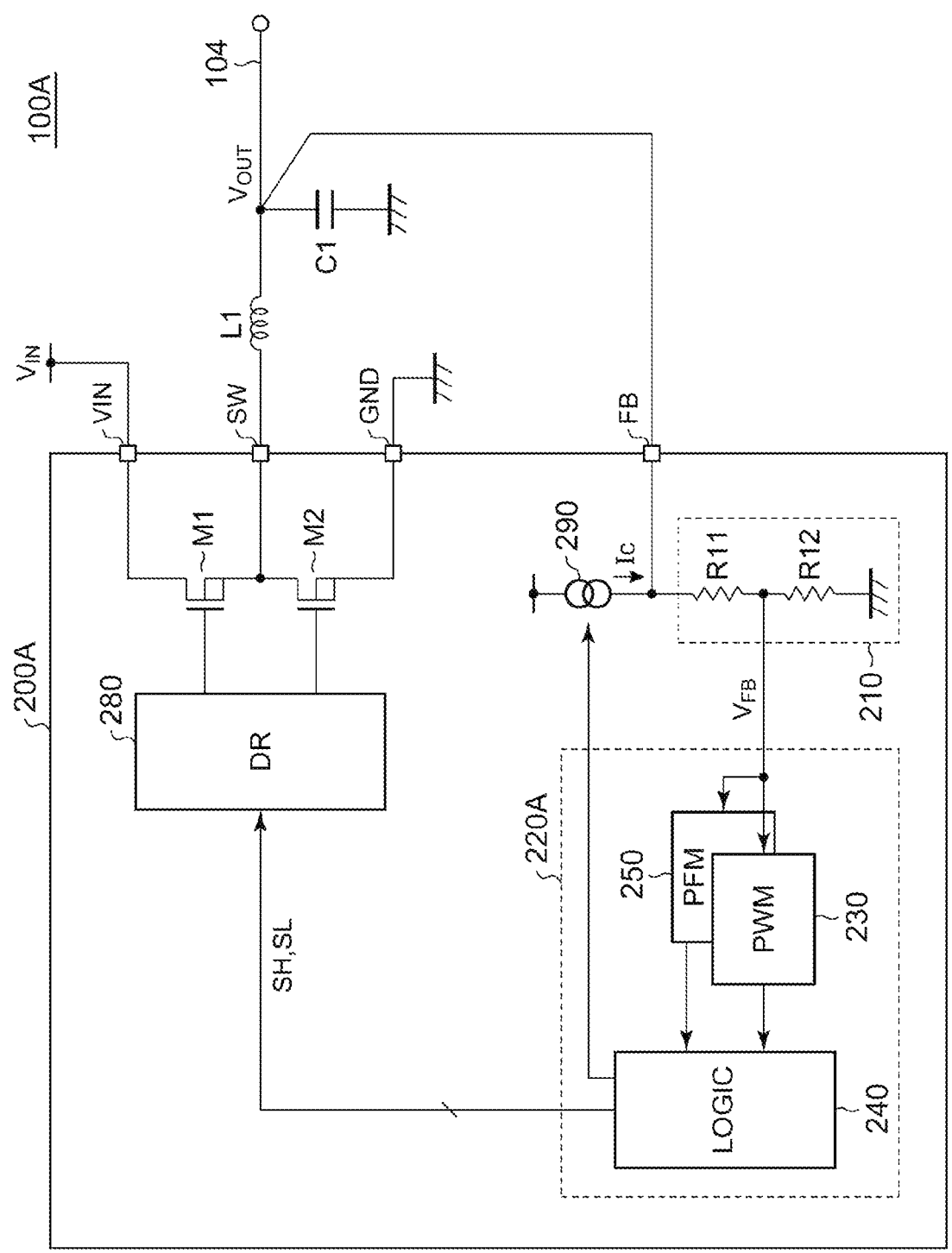
F I G. 5

BUCK DC/DC CONVERTER AND CONTROLLER CIRCUIT OF BUCK DC/DC CONVERTER

CROSS REFERENCE TO RELATED APPLICATIONS

This application claims priority benefit of Japanese Patent Application No. JP 2022-151832 filed in the Japan Patent Office on Sep. 22, 2022. Each of the above-referenced applications is hereby incorporated herein by reference in its entirety.

BACKGROUND

The present disclosure relates to a buck direct current/direct current (DC/DC) converter.

A buck DC/DC converter is used to generate a voltage lower than an input voltage.

A controller circuit of the buck DC/DC converter controls feedback of a switching transistor of the buck DC/DC converter to bring a feedback signal indicating the electrical state of the buck DC/DC converter, specifically, an output voltage or an output current, close to a target state.

A semiconductor chip (die) on which the controller circuit is integrated is housed in a semiconductor package. In the semiconductor package, an electrode pad of the semiconductor chip is connected to a pin of the semiconductor package through a bonding wire.

An example of the related art is disclosed in Japanese Patent No. 7102307.

BRIEF DESCRIPTION OF THE DRAWINGS

FIG. 5 is a block diagram of a buck converter according to a second embodiment.

DETAILED DESCRIPTION

Overview of Embodiments

Figure 1:
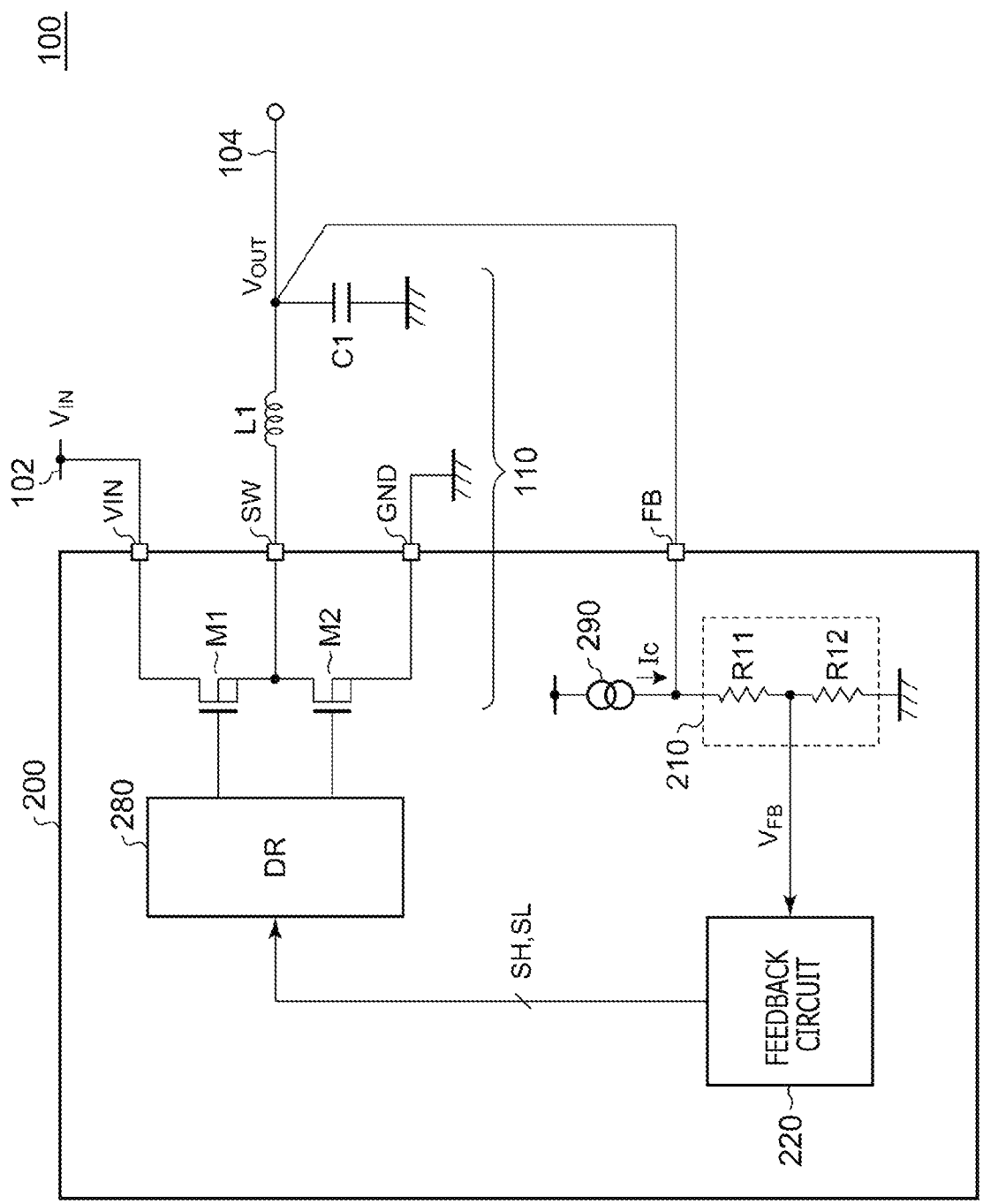
FIG. 1 is a circuit diagram of a buck DC/DC converter according to a first embodiment.

An overview of some exemplary embodiments of the present disclosure will be described. The overview simply describes some concepts of one or a plurality of embodiments for basic understanding of the embodiments as a preface to detailed explanation described later, and the overview does not limit the extent of the technology or the disclosure. The overview is not a comprehensive overview of all conceivable embodiments, and the overview is not intended to specify important elements of all the embodiments or to define the scope of part or all of the embodiments. For convenience, "one embodiment" may be used to represent one embodiment (example or modification) or a plurality of embodiments (examples or modifications) disclosed in the present specification.

An embodiment provides a controller circuit of a buck DC/DC converter. The controller circuit includes a feedback pin to be connected to an output line of the buck DC/DC converter, a voltage divider circuit including a first resistor and a second resistor connected in series between the feedback pin and a ground, a feedback circuit that generates a pulse modulation signal to bring a feedback voltage as an output of the voltage divider circuit close to a reference voltage, and a current source that is connected to the feedback pin and supplies a constant current.

According to this configuration, the constant current generated by the current source flows into the voltage divider circuit when the impedance of the feedback pin becomes high. As a result, a non-zero voltage drop occurs in the voltage divider circuit, and a non-zero feedback voltage is input to the feedback circuit. This can suppress the over voltage. The voltage of the feedback pin is stabilized by a main circuit of the buck DC/DC converter when the feedback pin is normally connected, and the current generated by the current source does not affect the feedback loop.

In a light load mode, the output impedance of the main circuit of the buck DC/DC converter becomes high, and the current generated by the current source may affect the feedback loop. Therefore, in an embodiment, the current source may be turned off when the buck DC/DC converter operates in the light load mode. Alternatively, in an embodiment, the amount of current generated by the current source may be small when the buck DC/DC converter operates in the light load mode. These can suppress the influence of the current generated by the current source on the feedback loop in the light load mode.

In an embodiment, the feedback controller may include an error amplifier that amplifies a difference between the feedback voltage and the reference voltage and a pulse width modulator that generates a pulse signal having a duty cycle corresponding to an output signal of the error amplifier.

In an embodiment, the controller circuit may be integrated into one semiconductor substrate. The "integration" includes a case in which all of the constituent elements of the circuit are formed on the semiconductor substrate and a case in which main constituent elements of the circuit are integrated. Some of the resistors, capacitors, and other constituent elements for adjusting circuit constants may be provided outside the semiconductor substrate. By integrating the circuit on one chip, the circuit area can be reduced, and the characteristics of the circuit elements can be kept uniform.

A buck DC/DC converter according to an embodiment may include any one of the controller circuits described above.

EMBODIMENTS

Preferred embodiments will now be described with reference to the drawings. The same signs are provided to the same or equivalent constituent elements, members, and processes illustrated in the drawings, and duplicate description will appropriately be omitted. The embodiments are exemplary and not intended to limit the disclosure or the technology. All features and combinations of the features described in the embodiments may not necessarily be essential for the disclosure and the technology.

In the present specification, a "state in which a member A is connected to a member B" includes a case in which the member A and the member B are physically and directly connected to each other as well as a case in which the member A and the member B are indirectly connected to each other through another member that does not substantially affect their electrical connection state and that does not impair functions and effects obtained by coupling of the members A and B.

Similarly, a "state in which a member C is connected (provided) between the member A and the member B" includes a case in which the member A and the member C or the member B and the member C are directly connected to each other as well as a case in which they are indirectly connected to each other through another member that does not substantially affect their electrical connection state and that does not impair functions and effects obtained by coupling of the members A and C or the members B and C.

In the present specification, the signs provided to electrical signals, such as voltage signals and current signals, as well as circuit elements, such as resistors, capacitors, and inductors, represent their voltage values, current values, or circuit constants (resistance values, capacitance values, or inductances) as necessary.

Vertical axes and horizontal axes of waveform diagrams and time charts referenced in the present specification are appropriately scaled up and down to facilitate the understanding, and each illustrated waveform is also simplified, exaggerated, or emphasized to facilitate the understanding.

First Embodiment

FIG. 1 is a circuit diagram of a buck DC/DC converter (hereinafter, referred to as a buck converter) 100 according to a first embodiment. The buck converter 100 steps down an input voltage $V_{IN}$ supplied to an input line 102 and generates a stepped-down output voltage $V_{OUT}$ in an output line 104.

The buck converter 100 includes a main circuit 110 and a controller integrated circuit (IC) 200. The controller IC 200 is an application specific integrated circuit (ASIC) integrated into one semiconductor substrate.

The main circuit 110 includes a high-side transistor M1, a low-side transistor M2, an inductor L1, and an output capacitor C1. The high-side transistor M1 and the low-side transistor M2 are connected in series between the input line 102 and a ground. One end of the inductor L1 is connected between a connection node (referred to as a switching pin) SW of the high-side transistor M1 and the low-side transistor M2 and the output line 104. The output capacitor C1 is connected between the output line 104 and the ground. The high-side transistor M1 and the low-side transistor M2 may be integrated into the controller IC 200 or may be external discrete parts.

The controller IC 200 includes a voltage divider circuit 210, a feedback circuit 220, a driver 280, and a current source 290.

A feedback pin FB of the controller IC 200 is connected to the output line 104, and the output voltage $V_{OUT}$ is input to the feedback pin FB. An input pin VIN of the controller IC 200 is connected to the input line 102. A GND pin is grounded.

The voltage divider circuit 210 includes a first resistor R11 and a second resistor R12 connected in series between the feedback pin FB and the ground. The voltage divider circuit 210 divides the output voltage $V_{OUT}$ input to the feedback pin FB and generates a feedback voltage $V_{FB}$.

$$V_{FB}=V_{OUT}\times R12/(R11+R12)$$

The feedback circuit 220 generates a pulse modulation signal Sp to bring the feedback voltage $V_{FB}$ as an output of the voltage divider circuit 210 close to a predetermined reference voltage $V_{REF}$. The feedback circuit 220 includes, for example, a pulse width modulator and adjusts a duty cycle (pulse width) of the pulse modulation signal Sp to bring the difference between the feedback voltage $V_{FB}$ and the reference voltage $V_{REF}$ close to zero. The feedback circuit 220 generates a high-side pulse SH and a low-side pulse SL based on the pulse modulation signal Sp.

The driver 280 drives the high-side transistor M1 on the basis of the high-side pulse SH and drives the low-side transistor M2 on the basis of the low-side pulse SL.

The current source 290 is connected to the feedback pin FB. The current source 290 supplies a constant current Ic. The constant current Ic can be set to satisfy the following formulas.

$$Ic\times R12 < V_{REF}$$

$$Ic > V_{REF}/R12$$

Figure 2:
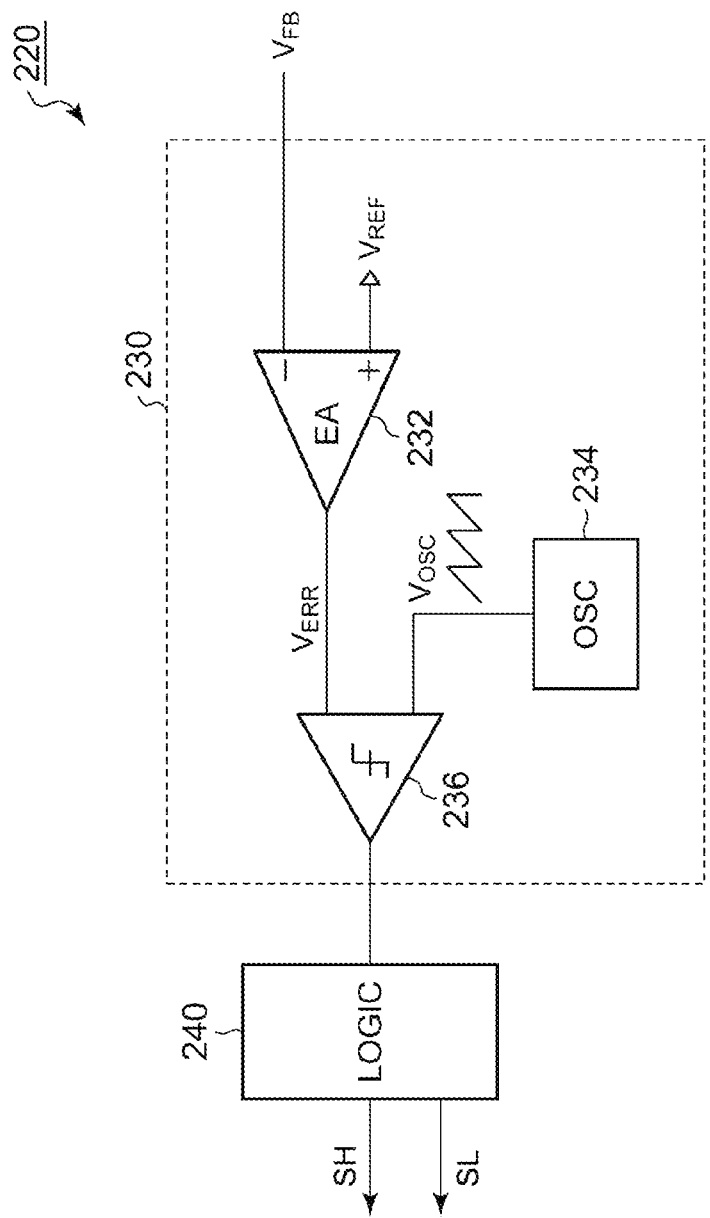
FIG. 2 is a block diagram illustrating a configuration example of a feedback circuit.

FIG. 2 is a block diagram illustrating a configuration example of the feedback circuit 220. In the example, the feedback circuit 220 includes a pulse width modulator 230 and a logic circuit 240. The pulse width modulator 230 adjusts a duty cycle of a pulse width modulation signal Spwm to bring the feedback voltage $V_{FB}$ close to the reference voltage $V_{REF}$. The pulse width modulator 230 includes an error amplifier 232, an oscillator 234, and a PWM comparator 236. The error amplifier 232 amplifies the difference between the feedback voltage $V_{FB}$ and the reference voltage $V_{REF}$ and generates an error voltage VERR. The oscillator 234 generates a periodic voltage Vosc that is a triangular wave or a sawtooth wave (ramp wave). The PWM comparator 236 compares the error voltage VERR and the periodic voltage Vosc and generates the PWM signal Spwm. The logic circuit 240 generates the high-side pulse SH and the low-side pulse SL on the basis of the PWM signal Spwm. Note that the configuration of the pulse width modulator 230 is not limited to the configuration of FIG. 2, and a well-known technology can be used for the pulse width modulator 230.

This completes the description of the configuration of the controller IC 200. Next, an operation of the controller IC 200 will be described.

Normal State

Figure 3:
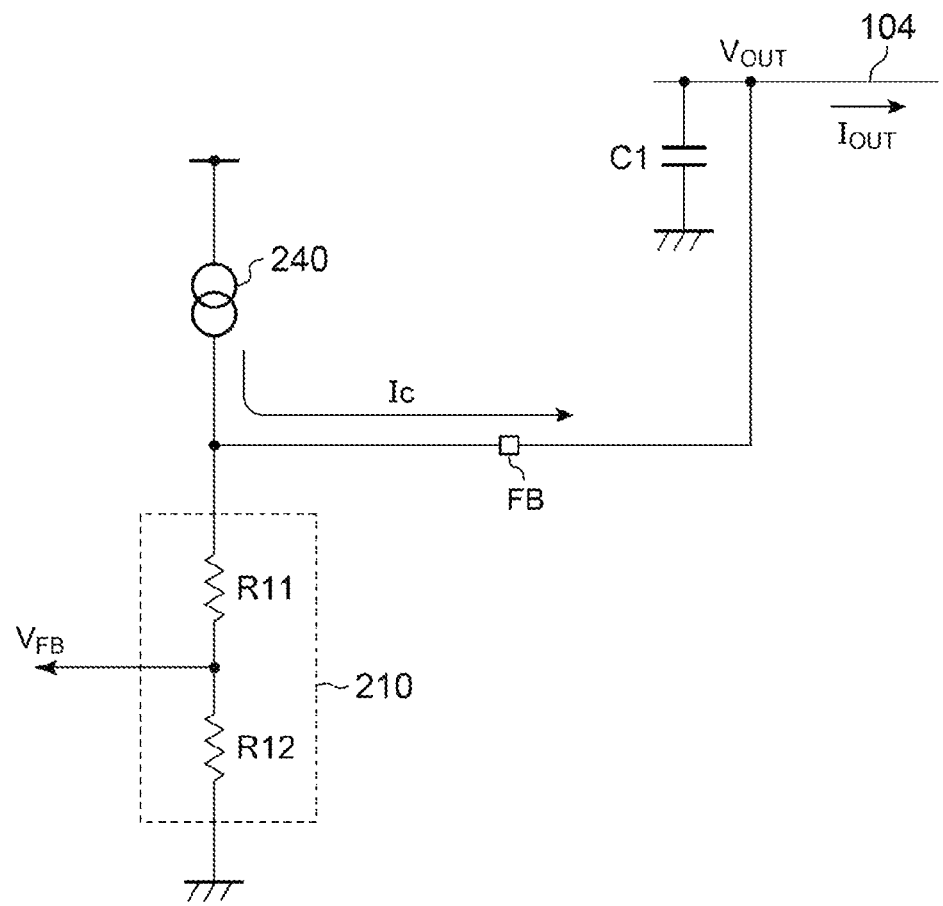
FIG. 3 is an equivalent circuit diagram of the buck converter in a normal state.

FIG. 3 is an equivalent circuit diagram of the buck converter 100 in a normal state. In the normal state, the feedback pin FB and the output line 104 are electrically correctly connected to each other, and the output voltage $V_{OUT}$ is fed back and input to the feedback pin FB. When the impedance of the voltage divider circuit 210 and the impedance of the main circuit 110 are compared with each other, the impedance of the main circuit 110 is sufficiently lower, and the constant current Ic generated by the current source 290 flows toward the main circuit 110 instead of the voltage divider circuit 210. Therefore, the current source 290 does not affect the feedback loop, and the feedback voltage $V_{FB}$ is as follows.

$$V_{FB}=V_{OUT}\times R12/(R11+R12)$$

The feedback circuit 220 controls the feedback to satisfy $V_{FB}=V_{REF}$, and as a result, the output voltage $V_{OUT}$ is stabilized at the following target voltage $V_{OUT(REF)}$.

$$V_{OUT(REF)}=V_{REF}\times (R11+R12)/R12$$

Abnormal State

Figure 4:
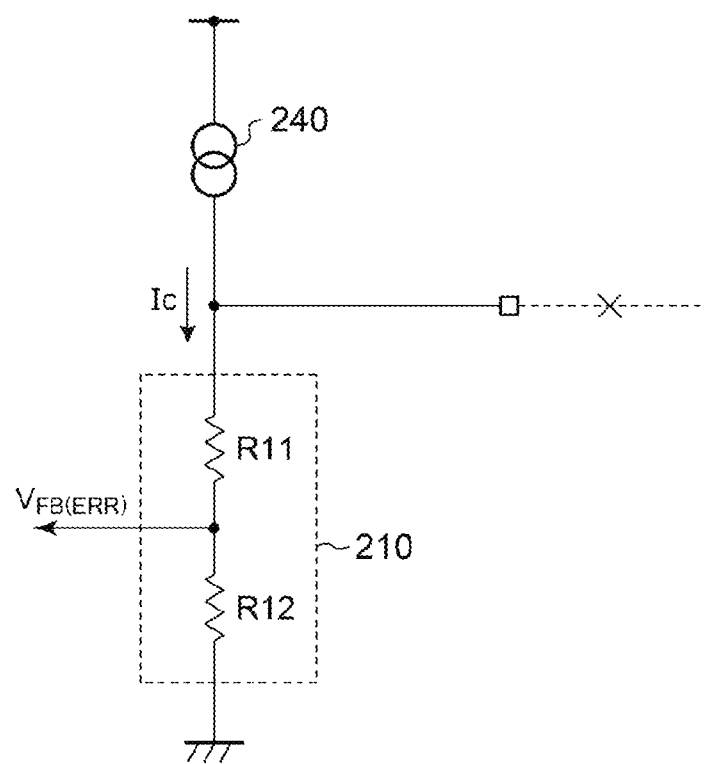
FIG. 4 is an equivalent circuit diagram of the buck converter in an abnormal state.

FIG. 4 is an equivalent circuit diagram of the buck converter 100 in an abnormal state. In the abnormal state, the feedback pin FB and the output line 104 are disconnected. In this state, the constant current Ic generated by the current source 290 flows into the voltage divider circuit 210. The feedback voltage $V_{FB}$ at this point is expressed by the following formula. This is a constant voltage independent of the output voltage $V_{OUT}$.

$$V_{FB(ERR)} = Ic \times R12$$

When $V_{FB(ERR)} > V_{REF}$ is satisfied, there is feedback in a direction in which the duty cycle of the pulse modulation signal Sp generated by the feedback circuit 220 approaches 0%. As a result, the output voltage $V_{OUT}$ gradually drops, and this can suppress occurrence of the over voltage state.

This completes the description of the operation of the buck converter 100. The buck converter 100 can prevent the over voltage state of the output voltage $V_{OUT}$ when there is a detachment of solder of the feedback pin FB or a detachment of bonding wire.

Second Embodiment

FIG. 5 is a block diagram of a buck converter 100A according to a second embodiment. A feedback circuit 220A of a controller IC 200A includes the pulse width modulator 230, a pulse frequency modulator 250, and the logic circuit 240. The pulse width modulator 230 is activated in a heavy load mode, and the pulse frequency modulator 250 is activated in a light load mode.

The feedback circuit 220A enters the light load mode when a current flowing through a load connected to the output line 104 is close to zero and enters the heavy load mode when the current flowing through the load is somewhat large.

Specifically, the pulse frequency modulator 250 monitors the feedback voltage $V_{FB}$ and asserts the pulse signal Sp (for example, shifts the pulse signal Sp to a high level) for a predetermined ON time $T_{ON}$ when the feedback voltage $V_{FB}$ drops to the reference voltage $V_{REF}$ (fixed ON time control system). During the ON time $T_{ON}$ in which the pulse signal Sp is asserted, the logic circuit 240 shifts the high-side pulse SH to an ON level and shifts the low-side pulse SL to an OFF level. During the ON time $T_{ON}$, the high-side transistor M1 is turned on, and the low-side transistor M2 is turned off.

During an OFF time $T_{OFF}$ following the ON time $T_{ON}$, the logic circuit 240 shifts the high-side pulse SH to the OFF level and shifts the low-side pulse SL to the ON level. During the OFF time $T_{OFF}$, the high-side transistor M1 is turned off, and the low-side transistor M2 is turned on. For example, the pulse frequency modulator 250 monitors a coil current $I_L$ flowing through the inductor L1. When the coil current $I_L$ becomes zero, the pulse frequency modulator 250 ends the OFF time $T_{OFF}$ and enters a high impedance period $T_{HZ}$.

During the high impedance period Tiu, the logic circuit 240 shifts both the high-side pulse SH and the low-side pulse SL to the OFF level. During the high impedance period $T_{HZ}$, both the high-side transistor M1 and the low-side transistor M2 are turned off. When the pulse signal Sp is asserted next, the logic circuit 240 returns to the ON time $T_{ON}$ from the high impedance period $T_{HZ}$.

The current source 290 can make a switch between an enabled state (ON state) for generating the constant current Ic and a disabled state (OFF state) for stopping the constant current Ic. The logic circuit 240 puts the current source 290 into the disabled state in the light load mode in which the pulse frequency modulator 250 is active, and puts the current source 290 into the enabled state in the heavy load mode in which the pulse width modulator 230 is active.

This completes the description of the configuration of the buck converter 100A.

The output impedance of the main circuit 110 of the buck converter 100A becomes high in the light load mode, and the constant current Ic generated by the current source 290 may affect the feedback loop. Therefore, when the buck converter 100A operates in the light load mode, the current source 290 can be turned off to suppress the influence of the current source 290 on the feedback loop.

Note that the current source 290 may be able to adjust the constant current Ic in two steps. The current source 290 may reduce the constant current Ic in the disabled state.

The embodiments are illustrative, and those skilled in the art will understand that there can be various modifications for combinations of the constituent elements and the processes of the embodiments and that the modifications can be included in the present disclosure and the scope of the present technology.

Supplement

The following technology is disclosed in the present disclosure.

Item 1

A controller circuit of a buck DC/DC converter, the controller circuit including:
  a feedback pin to be connected to an output line of the buck DC/DC converter;
  a voltage divider circuit including a first resistor and a second resistor connected in series between the feedback pin and a ground;
  a feedback circuit that generates a pulse modulation signal to bring a feedback voltage as an output of the voltage divider circuit close to a reference voltage; and a current source that is connected to the feedback pin and supplies a constant current.

Item 2

The controller circuit according to item 1, in which the current source is turned off when the buck DC/DC converter operates in a light load mode.

Item 3

The controller circuit according to item 1, in which the current source reduces the current when the buck DC/DC converter operates in a light load mode.

Item 4

The controller circuit according to any one of items 1 to 3, in which
  the feedback controller includes
    an error amplifier that amplifies a difference between the feedback voltage and the reference voltage, and
    a pulse width modulator that generates a pulse signal having a duty cycle corresponding to an output signal of the error amplifier.

Item 5

The controller circuit according to any one of items 1 to 4, in which
  the controller circuit is integrated into one semiconductor substrate.

Item 6

A buck DC/DC converter including:
the controller circuit according to any one of items 1 to 5.

According to an embodiment of the present disclosure, the over voltage of the output can be suppressed.

What is claimed is:

1. A controller circuit of a buck direct current/direct current converter, the controller circuit comprising:
   a feedback pin to be connected to an output line of the buck direct current/direct current converter;
   a voltage divider circuit including a first resistor and a second resistor connected in series between the feedback pin and a ground;
   a feedback circuit that generates a pulse modulation signal to bring a feedback voltage as an output of the voltage divider circuit close to a reference voltage, wherein
      the feedback circuit includes a pulse width modulator, a pulse frequency modulator, and a logic circuit,
      the pulse width modulator activates in a heavy load mode, and
      the pulse frequency modulator activates in a light load mode; and
   a current source that is connected to the feedback pin and supplies a constant current, wherein the logic circuit is configured to control the current source based on the activation of the pulse width modulator and the activation of the pulse frequency modulator.

2. The controller circuit according to claim 1, wherein the current source is turned off when the buck direct current/direct current converter operates in the light load mode.

3. The controller circuit according to claim 1, wherein the current source reduces the current when the buck direct current/direct current converter operates in the light load mode.

4. The controller circuit according to claim 1, wherein the controller circuit is integrated into one semiconductor substrate.

5. The buck direct current/direct current converter comprising:
   the controller circuit according to claim 1.

* * * * *